United States Patent [19]

Lemieux

[11] 4,369,867

[45] Jan. 25, 1983

[54] AUTOMATIC TRANSMISSION PARKING BRAKE MECHANISM

[75] Inventor: George E. Lemieux, Livonia, Mich.

[73] Assignee: Ford Motor Company, Dearborn, Mich.

[21] Appl. No.: 186,048

[22] Filed: Sep. 11, 1980

[51] Int. Cl.$^3$ .................. B60T 1/02; B60K 41/26
[52] U.S. Cl. .................. 192/4 A; 74/577 S; 188/31; 188/69
[58] Field of Search .................. 192/4 A; 188/31, 69; 74/577 S

[56] References Cited

U.S. PATENT DOCUMENTS

| | | | |
|---|---|---|---|
| 2,875,856 | 3/1959 | Mrlik et al. | 188/69 |
| 2,954,103 | 9/1960 | Sand | 192/4 A |
| 2,964,135 | 12/1960 | Sand | 192/4 A X |
| 3,213,968 | 10/1965 | Platz | 188/69 |
| 3,601,230 | 8/1971 | Platz | 188/31 |
| 3,912,050 | 10/1975 | Iwanaga et al. | 188/69 |

OTHER PUBLICATIONS

"1979 Ford/Mercury Shop Manual", Ford, Ford FMX Transmission, FIGS. 1 & 31, 1978.
1959 Ford Car Shop Manual, copyright Ford Motor Company, 1958, Part 7, pp. 7-25 and 7-40.

Primary Examiner—Rodney H. Bonck
Attorney, Agent, or Firm—Donald J. Harrington; Keith L. Zerschling

[57] ABSTRACT

A parking brake mechanism for an automatic transmission having a parking gear and a parking pawl, the latter being pivoted on a transmission housing, a cam plate and a detent plate journalled rotatably on a support shaft, for rotation to preselected angular positions determined by the detent geometry, a cam surface on the cam plate registering with the pawl and forcing the pawl into engagement with the gear, preloaded spring means joining said cam plate and said detent plate together and accommodating relative displacement thereof upon rotation of said detent plate when the pawl is out of registry with a space between adjacent teeth on said gear.

3 Claims, 4 Drawing Figures

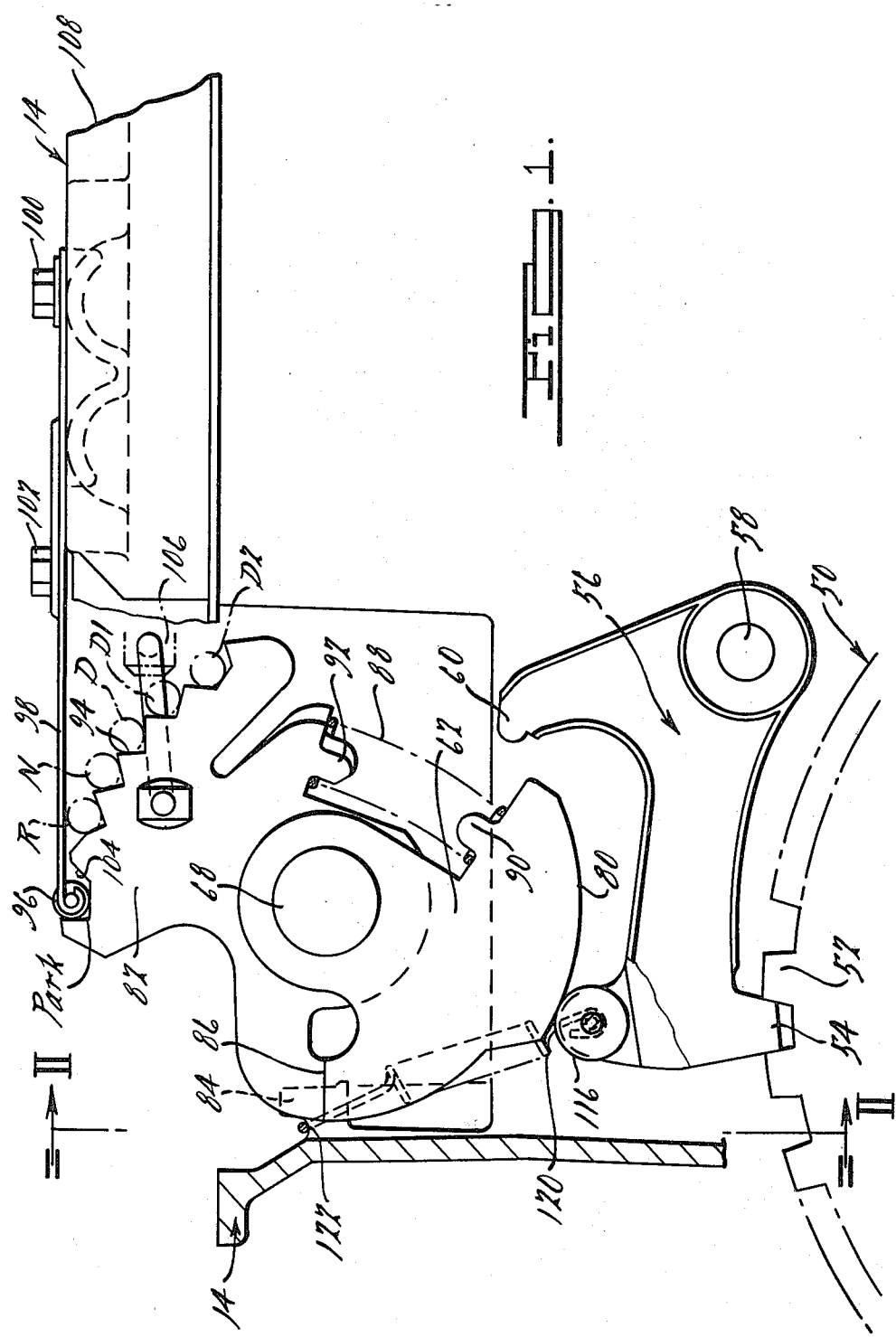

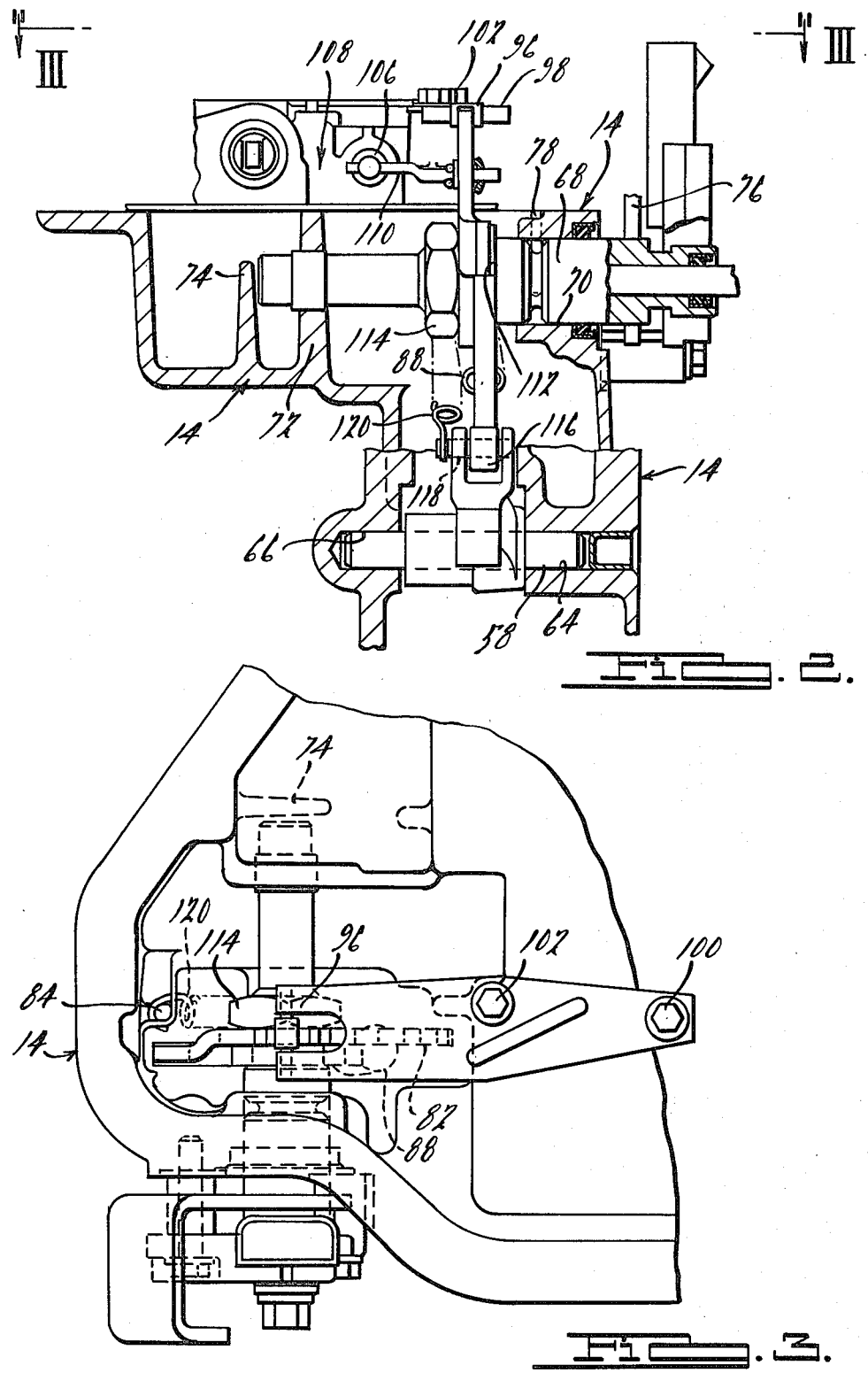

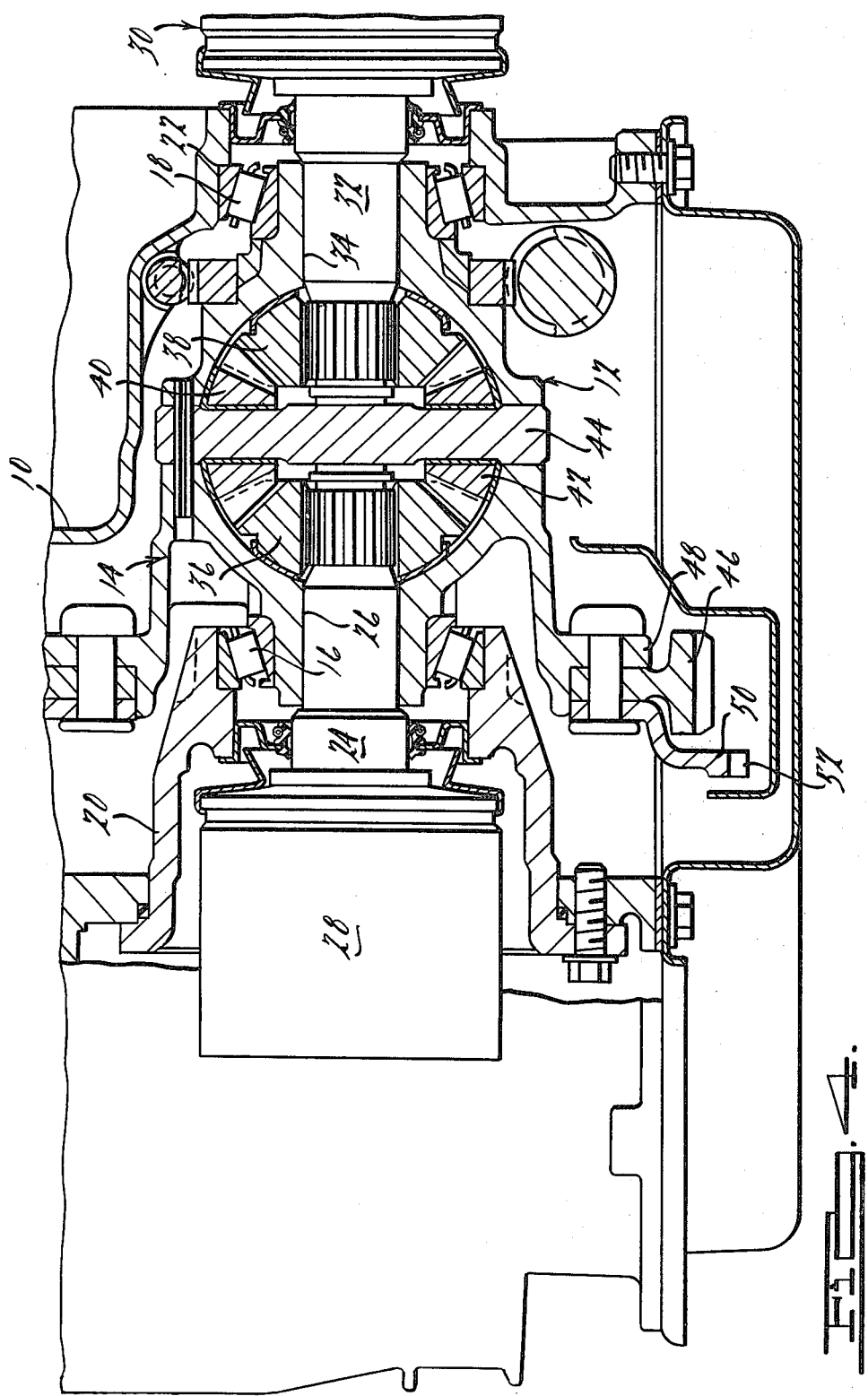

AUTOMATIC TRANSMISSION PARKING BRAKE MECHANISM

GENERAL DESCRIPTION OF THE INVENTION

The parking mechanism of this invention is an improvement in parking mechanisms shown in prior art U.S. Pat. Nos. 3,213,968, 3,601,230 and 2,875,856. Each of these references shows a parking brake comprising a parking gear located on the transmission output shaft and a parking pawl mounted pivotally on the transmission housing for engagement with the parking gear thereby locking the output shaft to the housing. The pawl is actuated by a driver operated brake actuator rod which is movable in a generally longitudinal direction with respect to the center line of the output shaft.

In the mechanism shown in U.S. Pat. No. 3,601,230, provision is made for effecting a manual override of the actuator rod when the parking pawl is misaligned with respect to the space between two teeth of the parking gear. This override mechanism is located at a position that is rather remote from the position of the pawl, and it includes a detent plate for defining several angular positions for the detent plate, the motion of the latter being translated into a linear motion of a manual range selector valve in the automatic transmission control system. U.S. Pat. No. 3,213,968 also shows an override spring, but it is located adjacent the pawl and is energized by a cam portion on the actuator rod when the pawl is misaligned with respect to the space between two teeth of the parking gear. Both of these prior art constructions include a manual park linkage mechanism for moving the actuator rod into and out of the parking brake engaged position. Because of the length of the rod and the numerous pivotal connections in the linkage mechanism, the brake is characterized by an elasticity due to a so-called stackup of tolerances in the brake actuating mechanism and due to the flexure of the rod itself from the remoteness of the pawl actuating portions from the driver operated elements of the mechanism.

The linkage mechanism shown in U.S. Pat. No. 2,875,856 is similar to those described in the preceding patent disclosures except that the pawl actuating cam carried by the rod is movable along the rod and is resisted by a preloaded spring against shifting movement. The preload of the spring is overcome if the park linkage is advanced to the park setting by the operator when the pawl and the space between adjacent teeth of the parking gear are misaligned.

Another transmission parking brake mechanism is shown in a 1978 publication of Ford Motor Company titled "1979 Ford/Mercury Shop Manual" for the Ford FMX transmission, particularly FIGS. 1 and 31. This parking brake mechanism uses a toggle lever for moving a pawl into and out of engagement with a parking gear carried by the transmission tailshaft. The toggle is actuated by a driver controlled toggle link which in turn is connected to a driver controlled toggle lever and a gear shift linkage mechanism. Although the pawl in such an arrangement is located relatively close to the driver controlled elements that actuate it, it is complicated, costly to manufacture and occupies a relatively large space within the transmission housing.

The improved parking brake mechanism of this invention is characterized by a cam plate that is pivoted on a control shaft which carries also a detent plate. The detent plate and the cam plate are held in registry, one with respect to the other, to form a common assembly that is adapted to be rotated by a driver controlled lever from one angular position to another. Upon rotation of the cam plate, the heel of a pawl engages a cam surface so that rotation of the cam plate in one direction causes locking engagement of the pawl with respect to the adjacent parking gear. Rotation of the cam plate in the opposite direction allows the pawl to be withdrawn under a spring force to a disengaged position. If the spring force is insufficient for some reason to disengage the pawl, a tail portion on the pawl will engage the cam plate so that the pawl will be forced out of engagement with respect to the gear when the detent plate moves out of the park position. A preloaded spring that forms part of the cam plate and detent plate assembly is compressed to allow relative displacement of the cam plate with respect to the detent plate when the pawl is misaligned with respect to the space between two adjacent teeth of the gear. This design provides less elasticity in the overall parking brake mechanism and it provides the driver with a positive feel. It also is lighter in weight than the parking brake mechanisms of the prior art constructions described above and has less friction thereby reducing the force necessary to engage and disengage the pawl with respect to the gear.

BRIEF DESCRIPTION OF THE FIGURES OF THE DRAWINGS

FIG. 1 shows a partial cross-sectional view a parking brake mechanism for an automatic transmission embodying the features of the invention.

FIG. 2 is a cross-sectional view taken along the plane of section line II—II of FIG. 1.

FIG. 3 is a plan view of the parking brake mechanism as seen from the plane of section III—III of FIG. 2.

FIG. 4 is a partial cross-sectional view of an automatic transaxle mechanism capable of embodying the improvements of the invention.

PARTICULAR DESCRIPTION OF THE INVENTION

The transmission structure of FIG. 4 has been disclosed in a co-pending application filed by G. E. Lemieux, R. T. Lewicki and J. A. Clauss entitled "Transaxle for a Vehicle Driveline", Ser. No. 134,240, filed Mar. 26, 1980, which is assigned to the assignee of the invention. Reference may be had to that application to supplement the present description.

In FIG. 4 reference character 10 designates a portion of a unitary transmission housing that contains a power output differential gear mechanism 12. The mechanism 12 comprises a differential carrier 14 journalled by spaced roller bearings 16 and 18 in bearing supports shown at 20 and 22, respectively. A first torque output shaft 24 is journalled in opening 26 in the carrier housing 14. The outboard end of the shaft 24 is adapted to be coupled to a first axle shaft for a vehicle traction wheel through a universal joint schematically at 28. A companion axle shaft for another vehicle traction wheel is coupled by universal joint 30 to another torque output shaft 32 journalled in opening 34 formed in the carrier housing 14. Side gear 36 is splined to shaft 24 and side gear 38 is splined to shaft 32. These mesh with differential pinions 40 and 42 journalled on pinion shaft 44, which in turn is joined to carrier housing 14.

Final drive gear 46 distributes torque from the output side of the multiple ratio transmission system to the differential carrier housing 14. It is bolted or riveted or secured by other means to peripheral flange 48 of the carrier housing 14. Secured also to the flange 48 is a parking gear 50 which rotates with the carrier housing 14; and when it is held stationary by a parking pawl mechanism, subsequently to be described, the vehicle traction wheels are locked.

Parking gear 50 has teeth 52 that are adapted to engage a parking pawl shown in FIG. 1 at 54. The pawl includes a pawl lever 56 that is journalled for oscillation on shaft 58. In the position shown in FIG. 1, pawl lever 56 is shown in the park or locked condition with the pawl 54 registering with the space between two adjacent teeth 52. Pawl lever 56 includes also a tail portion 60 which, as will be explained subsequently, is engageable with cam 62 which forms a part of the assembly illustrated in FIG. 1.

As seen in FIG. 2, a pawl supporting shaft 58 is mounted in aligned openings 64 and 66 in adjacent walls of the housing 14.

A supporting shaft 68, as seen in FIG. 2, extends in a direction normal to the plane of the cam plate 62. Shaft 68 is supported in housing 14 and is received in opening 70 formed in a wall portion of the housing 14 and by a web portion 72 formed in another portion of the housing 14. Axial displacement of the shaft 68 in a left hand direction is limited by a web 74. Journalled rotatably on shaft 68 also is a detent plate 82 situated directly adjacent cam plate 62.

An extended portion 84 of the detent plate 82 is offset with respect to the plane of the detent plate 82 so that it lies in the plane of the cam plate 62. Thus when the cam plate 62 and the detent plate 82 are in the position shown in FIG. 1, detent plate portion 84 engages surface 86 of the cam plate 62. The plate portion 84 is held fast against the surface 86 of the cam plate 62 by preloaded compression spring 88 located between an anchor portion 90 on the cam plate 62 and an anchor portion 92 on the detent plate 82. Because of the force of the spring 88, the cam plate 62 and the detent plate 82 rotate together normally in unison about the axis of the shaft 68. This rotation is achieved by means of lever 76 which, as mentioned earlier, is connected to driver operated linkage elements.

Detent recesses 94 are located in arcuate positions at a radially outward portion of the detent plate 82. These are engaged by a detent roller 96 carried at the extremity of a detent spring 98, which is anchored and held fast to housing 14 by anchor bolts 100 and 102. When the detent roller 96 is positioned as shown in FIG. 1, it registers with park detent recess 104. If detent plate 82 is rotated by the vehicle operator in a counterclockwise direction as viewed in FIG. 1, a transmission control manual valve 106 is adjusted axially. This valve forms a part of a control valve body and valve assembly generally indicated at 108 in FIGS. 1 and 2. For a complete description of this valve assembly, reference may be made to co-pending patent application Ser. No. 176,948, filed Aug. 11, 1980, by Douglas A. Whitney and Sergio Kavalhuna entitled "Automatic Transaxle Control System", which is assigned to the assignee of this invention. The detent plate 82 is connected to the manual valve 106 through an offset valve operating link 110.

The detent plate 82 and the cam plate 62 are held axially fast against a shoulder 112 on the shaft 68 by a lock nut 114 threadably received on a threaded part of the shaft 68.

As the detent plate 82 moves in a counterclockwise direction, detent roller 96 successively engages the detent recesses to establish a reverse drive position "R", neutral position "N", automatic drive range position "D", automatic drive range position "$D_2$" and automatic drive range position "$D_1$". Each of these positions is indicated by the appropriate letter notations in FIG. 1.

When the pawl 54 is engaged with a space between two parking gear teeth 52, a roller 116 carried by the pawl lever 56 is engaged by the cam surface 80. Roller 116 is journalled on roller shaft 118 shown in FIG. 2. A tension spring 120 extends from a shaft 118 to a spring anchor 122 in the housing 14. Spring 120 tends to move the pawl 54 out of engagement with the parking gear when the cam surface 80 is moved in a clockwise direction out of engagement with the roller 116.

If the cam plate 62 and the associated detent plate 82 are rotated toward the park position and the pawl 54 is misaligned with respect to one of the opening between the teeth 52, pawl 54 will engage the top of one of the teeth 52. Further rotation of detent plate 82 will cause compression of spring 88 and relative angular displacement of detent plate 82 with respect to cam plate 62. Upon subsequent movement of parking gear 52, pawl 54 registers with an opening between the teeth 52 and the spring 88 then causes the cam plate to urge pawl 54 into registry with the parking gear with a snap action. Further movement of the parking gear then is prevented.

This design is substantially more compact than designs of prior art constructions of the type described in this specification, and it requires fewer parts. It also is characterized by reduced friction. This is due in part to the smooth rolling action of the cam surface 80 with respect to the pawl and the pawl roller 116. It also provides a positive feel for the operator as he moves the detent plate from one position to the other with a minimum stackup of tolerances in the braking mechanism and with a relatively reduced elasticity in the system.

My invention is capable also of avoiding a so-called hang-up condition when the pawl is engaged with the parking gear after movement of the detent plate from the park position. If for some reason the spring 120 is incapable of moving the parking pawl out of engagement with the parking gear either due to friction between the pawl and the parking gear teeth or due to a malfunction of the spring itself, the cam 80 under such conditions will engage the tail portion 60 of the detent lever 56 thereby forcing the detent lever to move about its mounting shaft 58 in a clockwise direction as seen in FIG. 2. This positive disengagement feature is redundant with respect to the disengagement function of the spring 120.

Having described a preferred form of my invention, what I claim and desire to secure by U.S. Letters Patent is:

1. A transmission parking brake for anchoring a transmission power output shaft to a relatively stationary transmission housing comprising:
a parking gear carried by and rotatable with said power output shaft, said parking gear having external teeth;
a parking pawl lever mounted on said housing for oscillation about a first axis, said pawl lever having a pawl adapted to engage said teeth when said pawl lever is oscillated in one direction, means for moving said pawl lever in the opposite direction, said pawl lever having a cam follower thereon;

a detent plate mounted on a second axis spaced from said first axis;

a cam plate mounted on said second axis adjacent said detent plate, a support shaft for supporting said detent plate and said cam plate for oscillation about said second axis, said detent plate and said cam plate having engageable parts that are engaged, one with respect to the other;

a cam surface on said cam plate adapted to engage a follower portion of said pawl lever;

spring means engageable with said detent plate and said cam plate to urge them into mutual engagement;

means for adjusting said detent plate and said cam plate in said one direction whereby said cam surface forces said pawl into locking engagement with said gear; and said means for moving said pawl lever in said opposite direction comprising a tail portion on said pawl lever, said cam plate being adapted to engage said tail portion when said cam plate is moved out of the gear locking position, said cam plate and said tail portion being located generally in a common plane of movement.

2. The combination as set forth in claim 1 wherein said means for moving said pawl lever in said opposite direction comprises also a preloaded spring acting between said pawl lever and said housing.

3. The combination as set forth in claim 1 wherein said first and second axes are disposed in spaced, parallel disposition with respect to the axis of said gear.

* * * * *